US011364398B2

(12) United States Patent
Brown

(10) Patent No.: US 11,364,398 B2
(45) Date of Patent: Jun. 21, 2022

(54) HEAT AND FIRE RESISTANT GEL SEAL

(71) Applicant: LAWRENCE LIVERMORE NATIONAL SECURITY, LLC, Livermore, CA (US)

(72) Inventor: Erik P. Brown, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/667,886

(22) Filed: Aug. 3, 2017

(65) Prior Publication Data

US 2019/0038924 A1    Feb. 7, 2019

(51) Int. Cl.
| F16J 15/00 | (2006.01) |
| A62C 2/06 | (2006.01) |
| C09D 5/18 | (2006.01) |
| F16L 5/04 | (2006.01) |
| F16L 21/00 | (2006.01) |
| F16L 57/04 | (2006.01) |

(52) U.S. Cl.
CPC ............. *A62C 2/065* (2013.01); *C09D 5/185* (2013.01); *F16J 15/00* (2013.01); *F16L 5/04* (2013.01); *F16L 21/005* (2013.01); *F16L 57/04* (2013.01)

(58) Field of Classification Search
CPC .. F16J 15/008; F16J 15/06; F16L 5/04; A62C 2/065; C09D 5/185
See application file for complete search history.

(56) References Cited

U.S. PATENT DOCUMENTS

| 4,156,533 | A | * | 5/1979 | Close | F01N 3/2857 277/652 |
| 4,636,538 | A | * | 1/1987 | Malcolm-Brown | C09K 21/14 523/179 |
| 4,743,625 | A | * | 5/1988 | Vajs | C04B 26/32 252/606 |
| 5,137,658 | A | * | 8/1992 | Stahl | C09K 21/02 252/606 |
| 5,254,410 | A | * | 10/1993 | Langer | B01D 53/9454 252/378 R |
| 7,717,114 | B1 | * | 5/2010 | Laghi | A61M 16/06 128/206.12 |
| 8,510,996 | B2 | * | 8/2013 | Foster | E06B 5/164 49/489.1 |
| 8,844,938 | B2 | | 9/2014 | Brown | |
| 9,365,017 | B2 | * | 6/2016 | Kreysler | E04B 1/942 |
| 2013/0068104 | A1 | * | 3/2013 | Brown | F16J 15/02 96/361 |
| 2013/0187337 | A1 | * | 7/2013 | Brown | F16J 15/008 277/312 |
| 2014/0260929 | A1 | * | 9/2014 | Leites | F16B 31/005 89/1.14 |

FOREIGN PATENT DOCUMENTS

EP         2 412 409 A1    2/2012

* cited by examiner

*Primary Examiner* — Christine M Mills
*Assistant Examiner* — L. Susmitha Koneru
(74) *Attorney, Agent, or Firm* — Eddie E. Scott

(57) ABSTRACT

A combination seal connects a filter or an equipment component to a base. The combination seal includes a seal material and flecks or particles made of intumescent material interspersed within the seal material. The flecks or particles of intumescent material undergo a chemical change when exposed to flames or heat and expand to maintain seal effectiveness and longevity without compromise.

3 Claims, 10 Drawing Sheets

HEAT AND FIRE RESISTANT GEL SEAL

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to filters, equipment, or systems and more particularly to a heat and fire resistant gel seal.

State of Technology

This section provides background information related to the present disclosure which is not necessarily prior art.

Efforts have been made to solve a problem with ceramic HEPA filters, specifically, how to maintain the seal between a HEPA filter and its housing in the event of high temperatures, e.g. in a fire. Existing foam and Blu-Gel™ filter gaskets, utilized to seal between the HEPA filter and housing, have limited effective operating temperature ranges. Existing gaskets are adequate for normal DOE operational temperature ranges, but the desire is to develop a "fire resistant" HEPA filter, in which case significantly greater heat resistance is needed.

European Patent Application No. EP 2 412 409 for single-body intumescent gaskets for cold and hot smoke sealing, in particular for fire dampers published Jan. 2, 2010 provides the state of technology information reproduce below.

"The present invention relates to intumescent gaskets for hot smoke and also cold smoke sealing, particularly suitable for fire dampers.

Fire dampers are used in the compartmentalisation of fire-fighting zones in ventilation and for air-conditioning systems and their purpose is to avoid the propagation of smoke in the air distribution channels during a fire by means of the closure of the respective blade mounted on said damper.

The closure of the blades generally takes place when a sensing member present thereon reaches the temperature of 72° C.; however, the intumescent gaskets mounted on the blade or in the immediate vicinity thereof generally ensure good hot smoke sealing, generally at temperatures higher than 110° C., thanks to the expansion of the intumescent material, but are not suitable for lower temperature smoke sealing.

This is due to the fact that gaskets for fire dampers available to date on the market are formed in actual fact by two different gaskets adjacent one to the other and not integral, each one suitable for performing a different task: the first gasket is suitable for fire damping and hot smoke sealing which is made up of a band (A) in intumescent material having a minimum expansion temperature of 120-200° C., which can also be covered by a profile (B) in plastic, rigid or semi-rigid; the second gasket is suitable for cold smoke sealing which is made up, for example, of expanded polyurethane foam (C).

The limits of this technical solution lie in having to use two different gaskets with different function to ensure the functioning of the entire system, and in having to attach the gasket (C), for example in polyurethane foam, close to the other gasket and to the blade by means of appropriate adhesives. Moreover, in the specific case of profiles for intumescents in rigid plastic, for example those for containing intumescent calcium silicates, their elastic and sealing performances are limited due to the reduced adaptability to curvilinear shapes.

To overcome this problem of elasticity and of sealing attempts were made to incorporate the intumescent material, in general intumescent graphite, in a PVC matrix so as to generate a composite suitable for being extruded in flexible tubular form: however the incorporation of intumescent material in a polymeric matrix such as PVC results in a smaller expansion of the intumescent material at the time of use since it expands partially already during the incorporation and/or crosslinking of the tubular article, and therefore with lower fire damping performances. Moreover, the obtaining of flexible gaskets with smooth surface from said extrudable matrices is difficult and their combustion generates toxic fumes such as hydrochloric acid.

Profiles in plastic are not known to date which are flexible and which contain intumescent material able both to seal against cold smoke and to expand completely during the fire."

U.S. Pat. No. 8,844,938 for emergency sacrificial sealing method in filters, equipment, or systems provides the state of technology information reproduced below.

"In one embodiment, the present invention provides an apparatus that seals a filter or equipment component to a base and will continue to seal the filter or equipment component to the base in the event of hot air or fire. The apparatus includes a seal material between the filter or equipment component and the base; and an intumescent material between the filter or equipment component and the base and proximate the seal material. The intumescent material and the seal material are positioned relative to each other and relative to the filter or equipment component and the base to seal the filter or equipment component to the base. Upon the event of fire said intumescent material will be activated and will expand to continue to seal the filter or equipment component to the base in the event of hot air or fire. In another embodiment, the present invention provides a method of sealing a filter or equipment component to a base and will continuing to seal the filter or equipment component to the base in the event of hot air or fire. The method includes the steps of positioning a seal material between the filter or equipment component and the base to provide a seal of the filter or equipment component to the base. An intumescent material is positioned between the filter or equipment component and the base and proximate the seal material. The intumescent material and the seal material are positioned relative to each other and relative to the filter or equipment component and the base to seal the filter or equipment component to the base. Upon the event of fire, the intumescent material will be activated and expand to continue to seal the filter or equipment component to the base."

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's apparatus, systems, and methods use intumescent material(s), organic, or inorganic compound(s) in conjunction with gel type seals. The expanding material(s) either displace and replace the normal operational seals, or backs up (back fills, supports, or otherwise continues the function of) the normal operational seal as it burns away. In this case the inventor's apparatus, systems, and methods intumescent material is interspersed within the gel seal in the form of flecks or particles. The flecks or particles can be of several types, some that activate at lower temperatures and some at higher temperatures. They can also be of different expatiation ratios. The flecks or particles can be of different sizes and densities within the gel seal for the desired performance. By limiting the quantity of flecks or particles of the seal by volume, the gel seal effectiveness and longevity can be maintained without compromise. The inventor's apparatus, systems, and methods provides a new gel seal that is more heat resistant than existing seals. The inventor's apparatus, systems, and methods have use in protect equipment, components from spread of fire, air leakage, or separation in the event of unexpected high temperatures or flames.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1A:
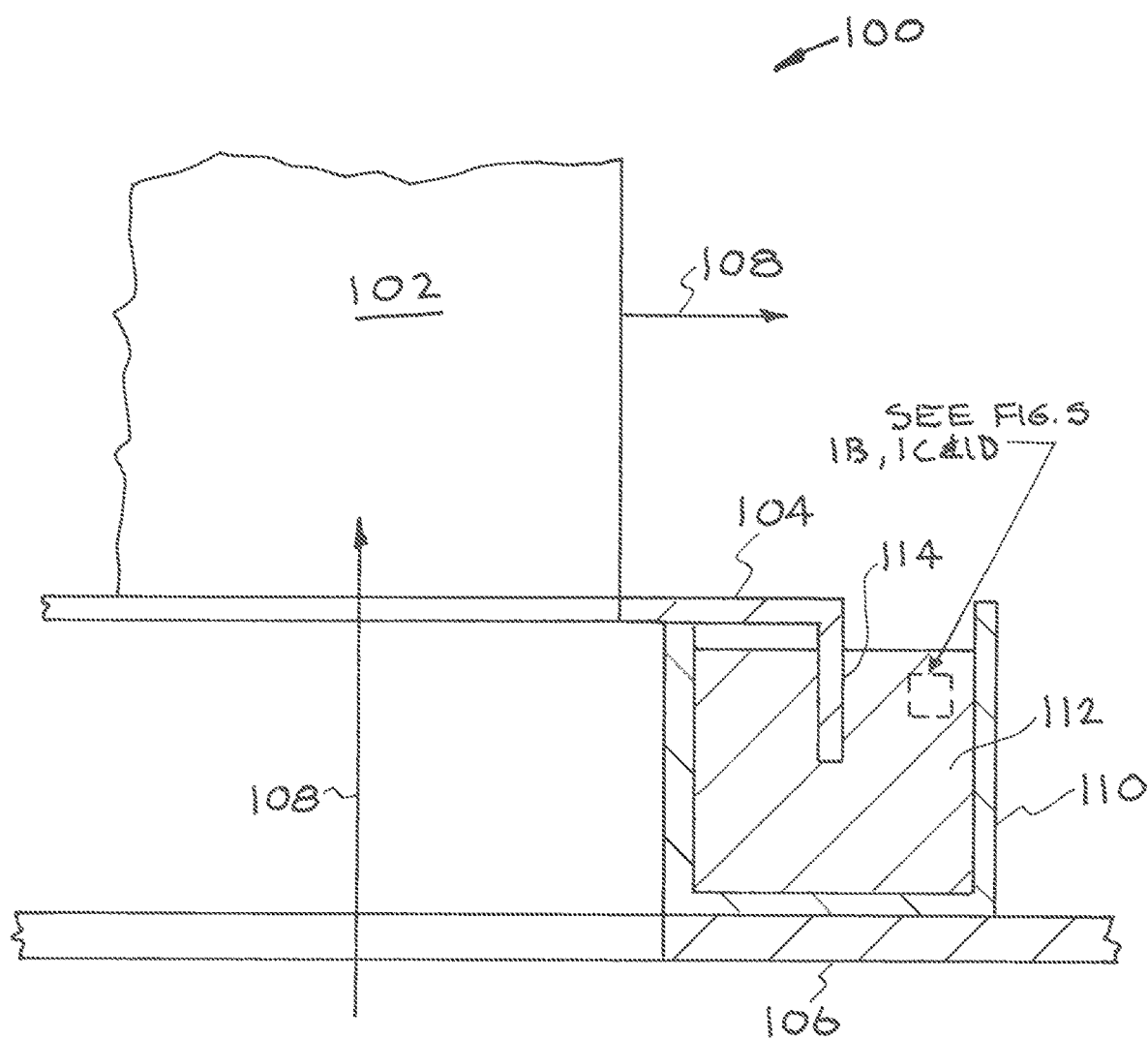
FIG. 1A illustrates a filter positioned over a base or filter support and a combination seal between the filter and the base or filter support.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventor's apparatus, systems, and methods provide a system that seals a filter or equipment component to a base and will continue to seal the filter or equipment component to the base in the event of hot air or fire. The inventor's apparatus, systems, and methods include a combination seal between the filter or equipment component and the base. The combination seal includes a seal material and interspersed flecks or particles of intumescent material interspersed in the seal material. The combination seal is positioned relative to the filter or equipment component and the base to seal the filter or equipment component to the base. Upon the event of a fire the combination seal will expand to continue to seal the filter to the base in the event of hot air or fire.

Various Examples of Combination Seal

Referring now to the drawings and in particular to FIGS. 1A, 1B, 1C, and 1D; various example embodiments of the inventor's apparatus, systems, and methods are illustrated. The inventor's apparatus, systems, and methods provide a combination sealing system. The combination sealing system is designated generally by the reference numeral 100. The combination sealing system 100 provides a sealing connection between a filter or equipment component and a base. The combination sealing system 100 includes a combination seal made of a seal material with interspersed flecks or particles within in the seal material. The combination seal is positioned relative to the filter or equipment component and it's base to seal the filter or equipment component to the base. Upon the event of a fire or hot air the combination seal will expand to continue to seal the filter to the base during the fire or hot air event.

Figure 1B:
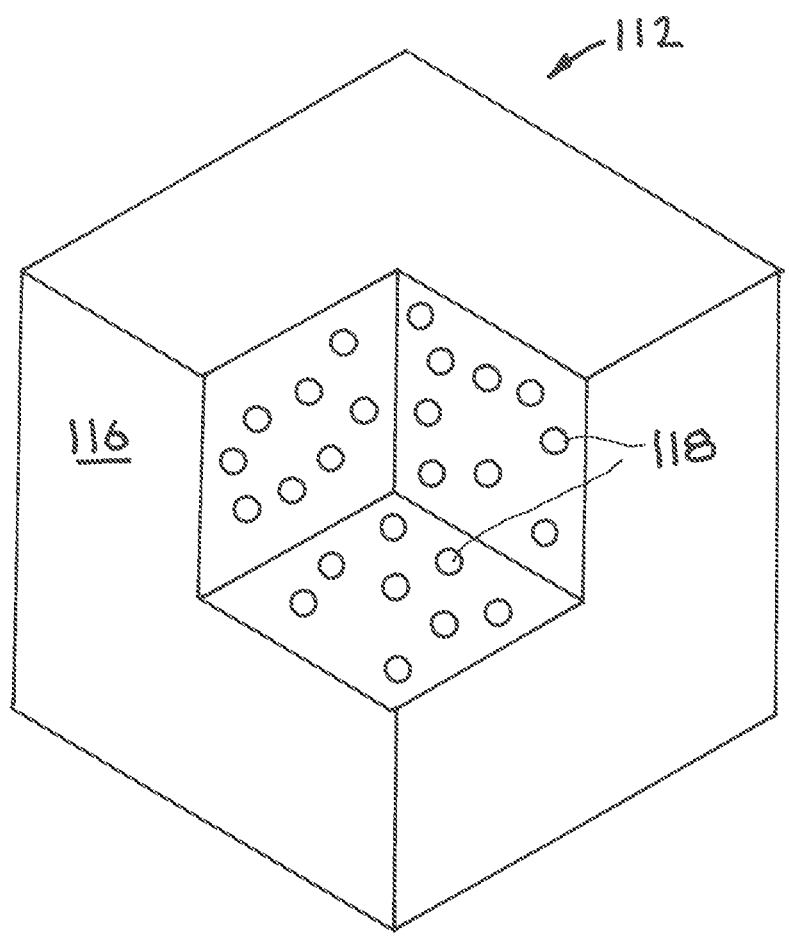
FIG. 1B illustrates one of the embodiments of the combination seal.
Figure 1C:
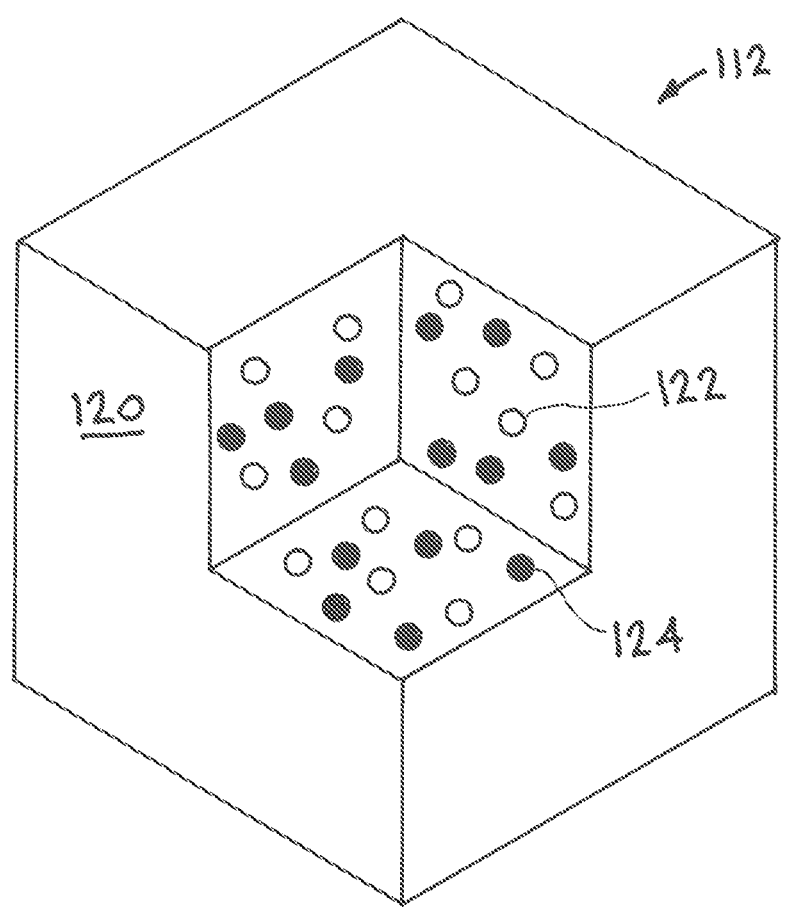
FIG. 1C illustrates another of the embodiments of the combination seal.
Figure 1D:
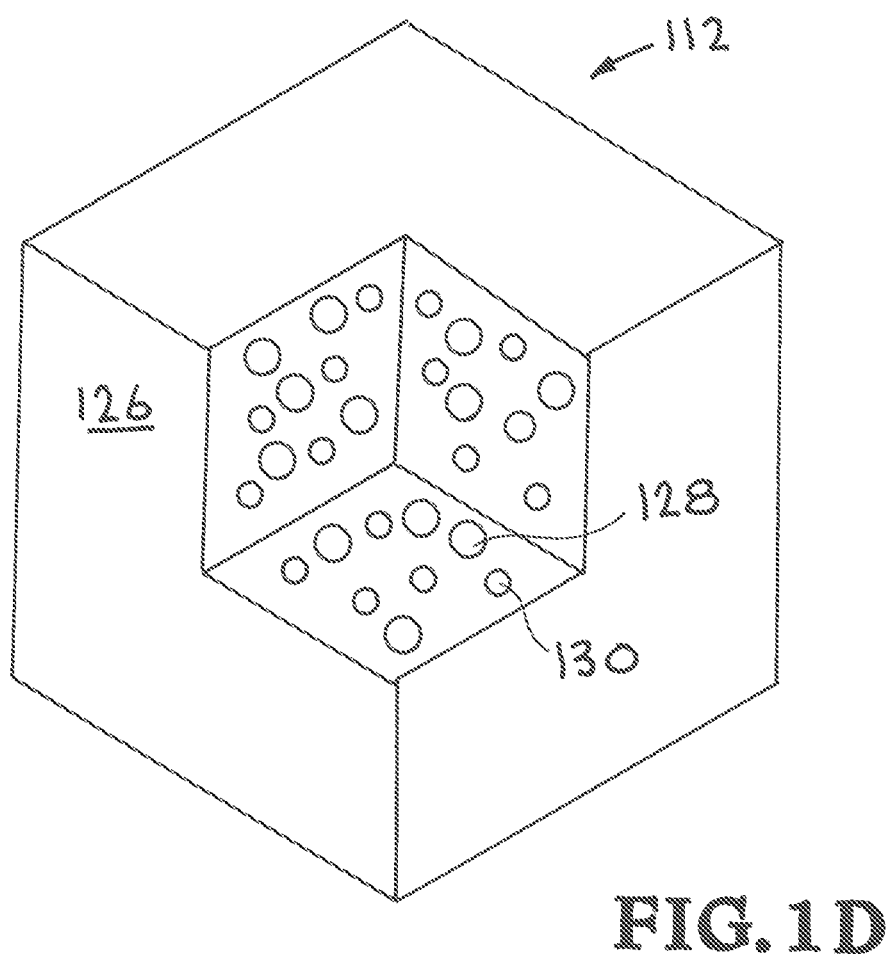
FIG. 1D illustrates yet another of the embodiments of the combination seal.

Referring again to FIGS. 1A, 1B, 1C, and 1D, various individual example embodiments of the combination sealing system 100 are illustrated. FIG. 1A shows a filter 102 positioned over a base or filter support 104. The filter 102 and the base or filter support 104 are positioned over an enclosure 106 such as a wall, ceiling or floor. Flow of the fluid being filtered is identified by the reference numeral 108. The flow of the fluid 108 passes through the enclosure 106 into the filter element 102 and through the filter element 102 as indicated by the arrow 108. A seal housing 110 contains the combination seal 112. An extension or blade 114 extends into the combination seal 112. FIGS. 1B, 1C, and 1D, illustrate various individual example embodiments of the seal 112. The combination sealing system 100 and the various individual example embodiments of the seal 112 illustrated in FIGS. 1B, 1C, and 1D include the components listed below.

Component 102—filter,
Component 104—base or filter support,
Component 106—enclosure such as a wall, ceiling or floor,
Component 108—flow of the fluid,
Component 110—seal housing,
Component 112—combination seal,
Component 114—extension or blade that extends into the seal material,
Component 116—seal material,
Component 118—interspersed flecks or particles of intumescent material,
Component 120—seal material,
Component 122—interspersed flecks or particles of a first intumescent material,
Component 124—interspersed flecks or particles of a second intumescent material,
Component 126—seal material,
Component 128—interspersed flecks or particles of a first intumescent material, and
Component 130—interspersed flecks or particles of a second intumescent material.

Referring now to FIGS. 1B, 1C, and 2D; some of the embodiments of the combination seal 112 are illustrated. The filter is sealed to the base or filter support by the combination seal 112. The combination seal 112 uses intumescent material(s), organic, or inorganic compound(s) in conjunction with a seal material. The intumescent material is interspersed within the seal material in the form of flecks or particles. The flecks or particles can be of several types, some that activate at lower temperatures and some at higher temperatures. They can also be of different expatiation ratios. The flecks or particles can be of different sizes and densities within the seal material for the desired performance. By limiting the quantity of flecks or particles of the seal by volume, the seal effectiveness and longevity can be maintained without compromise. This creates a new type of seal that is more heat resistant than the existing seal material by itself. The intumescent material is a material that undergoes a chemical change when exposed to heat or flames, becoming viscous then forming expanding bubbles that harden into a dense, heat insulating multi-cellular char. This expanding char can seal, insulate, and protect mating surfaces and joints, helping to prevent warping, subsequent leakage and damage.

Referring now to FIG. 1B one of the embodiments of the combination seal 112 is illustrated. This embodiment 112 uses a seal material 116. The seal material 116 in this embodiment is made of gel material. The seal material 116 is interspersed with flecks or particles 118. The flecks or particles 118 are made of intumescent material. In the event of a fire or hot air the gel seal material 116 and the flecks or particles 118 expand to maintain an effective seal.

The gel seal material 116 and the flecks or particles 118 intumescent material undergo a chemical change when exposed to heat or flames, becoming viscous then forming expanding bubbles that harden into a dense, heat insulating multi-cellular char. This expanding char seals, insulates, and protects mating surfaces and joints, helping to prevent warping, subsequent leakage and damage.

Referring now to FIG. 1C another of the embodiments of the combination seal 112 is illustrated. This embodiment 112 uses a seal material 120. The seal material 120 in this embodiment is made of a gel material. The seal material 120 is interspersed with flecks or particles 122 and flecks or particles 124. The flecks or particles 122 and 124 are made of intumescent materials. In the event of a fire or hot air the gel seal material 120 and the flecks or particles 122 and 124 expand to maintain an effective seal.

The gel seal material 120 intumescent material and the flecks or particles 122 and 124 intumescent material undergo a chemical change when exposed to heat or flames, becoming viscous then forming expanding bubbles that harden into a dense, heat insulating multi-cellular char. This expanding char seals, insulates, and protects mating surfaces and joints, helping to prevent warping, subsequent leakage and damage. The flecks or particles 122 and 124 are different. In one embodiment, the flecks or particles 122 and the flecks or particles 124 are of different types. For example, the flecks or particles 122 are made of an intumescent material that activates at a lower temperature and the flecks or particles 124 are made of an intumescent material that activates at a higher temperature. They can also be of different expatiation ratios.

Referring now to FIG. 1D another of the embodiments of the combination seal 112 is illustrated. This embodiment 112 uses a seal material 126. The seal material 126 in this embodiment is made of gel material. The seal material 126 is interspersed with flecks or particles 128 and flecks or particles 130. The flecks or particles 128 and 130 are made of intumescent materials. In the event of a fire or hot air the seal material 126 and the flecks or particles 128 and 130 expand to maintain an effective seal.

The seal material 126 intumescent material and the flecks or particles 128 and 130 intumescent material undergo a chemical change when exposed to heat or flames, becoming viscous then forming expanding bubbles that harden into a dense, heat insulating multi-cellular char. This expanding char seals, insulates, and protects mating surfaces and joints, helping to prevent warping, subsequent leakage and damage. The seal material 126 and the flecks or particles 128 and 130 are made of intumescent material; however, the intumescent materials are different. The flecks or particles 128 and the flecks or particles 130 are of different types. For example, the flecks or particles 128 are and the flecks or particles 130 are of different sizes and densities. The flecks or particles 128 are larger and the flecks or particles 130 are smaller. The flecks or particles 128 are of a first density and the flecks or particles 130 are of a second and different density.

Figure 2A:
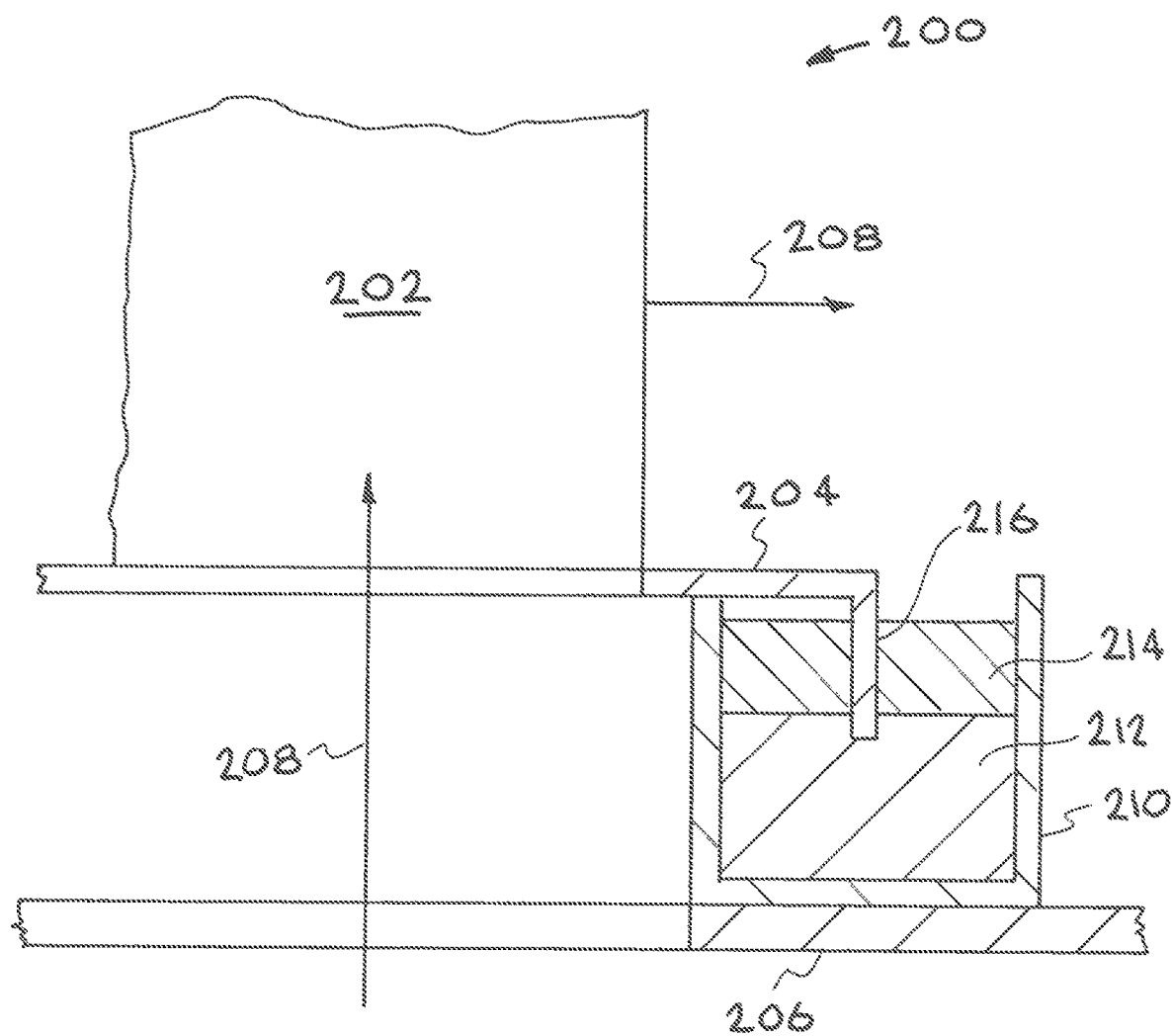
FIGS. 2A and 2B illustrate an example embodiment of the inventor's apparatus, systems, and methods wherein the location of the seal units are emphasized.

Referring now to FIG. 2A, another example embodiment of the inventor's apparatus, systems, and methods is illustrated. This embodiment is designated generally by the reference numeral 200. FIG. 2A shows a filter 202 positioned over a base or filter support 204. The filter 202 and the base or filter support 204 are positioned over an enclosure 206 such as a wall, ceiling or floor. Flow of the fluid being filtered is identified by the reference numeral 208. The flow of the fluid 208 passes through the enclosure 206 into the filter element 202 and through the filter element 202 as indicated by the arrow 208. A seal housing 210 contains a seal that includes seal unit 212 and seal unit 214. An extension or blade 216 extends into the seal 212, 214. The sealing system 200 includes the components listed below.

Component 202—filter,
Component 204—base or filter support,
Component 206—enclosure such as a wall, ceiling or floor,
Component 208—flow of the fluid,
Component 210—seal housing, Component 212—first seal unit,
Component 214—second seal unit, and
Component 216—extension or blade that extends into the seal.

The first seal unit 212 in this embodiment is interspersed with flecks or particles and flecks or particles made of intumescent materials. The first seal unit 212 interspersed with flecks or particles and flecks or particles made of intumescent materials can be made according to the embodiments of FIGS. 1A-1D or other seal units interspersed with flecks or particles and flecks or particles.

The second seal unit 214 is made of uniform intumescent material. The first seal unit 212 interspersed with flecks or particles made of intumescent materials is located below the second seal unit 214 made of uniform intumescent material. In the event of a fire or hot air the first seal unit 212 interspersed with flecks or particles made of intumescent materials and the second seal unit 214 made of uniform intumescent material will expand to maintain an effective seal.

Figure 2B:
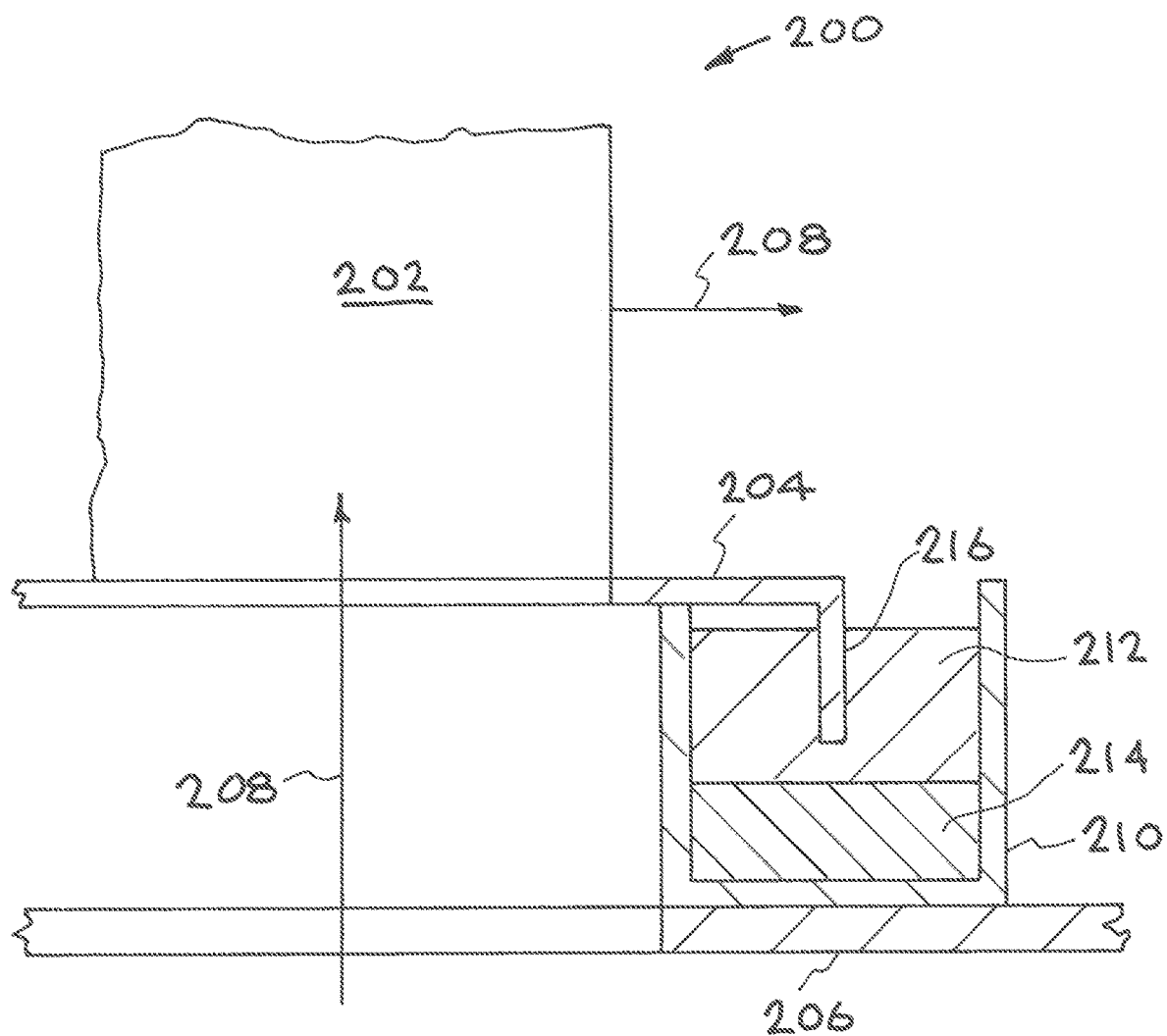

Referring now to FIG. 2B, an example embodiment of the inventor's apparatus, systems, and methods is illustrated wherein the location of the seal units are reversed. This embodiment is designated generally by the reference numeral 200. FIG. 2B shows a filter 202 positioned over a base or filter support 204. The filter 202 and the base or filter support 204 are positioned over an enclosure 206 such as a wall, ceiling or floor. Flow of the fluid being filtered is identified by the reference numeral 208. The flow of the fluid 208 passes through the enclosure 206 into the filter element 202 and through the filter element 202 as indicated by the arrow 208. A seal housing 210 contains a seal that includes seal unit 212 and seal unit 214. An extension or blade 216 extends into the seal 212, 214. The sealing system 200 of FIG. 2B includes the components listed below.

Component 202—filter,
Component 204—base or filter support,
Component 206—enclosure such as a wall, ceiling or floor,
Component 208—flow of the fluid,
Component 210—seal housing,
Component 212—first seal unit,
Component 214—second seal unit, and
Component 216—extension or blade that extends into the seal.

The first seal unit 212 in this embodiment is interspersed with flecks or particles and flecks or particles made of intumescent materials. The first seal unit 212 interspersed with flecks or particles and flecks or particles made of intumescent materials can be made according to the embodiments of FIGS. 1A-1D or other seal units interspersed with flecks or particles and flecks or particles.

The second seal unit 214 is made of uniform intumescent material. The first seal unit 212 interspersed with flecks or particles made of intumescent materials is located above the second seal unit 214 made of uniform intumescent material. In the event of a fire or hot air the first seal unit 212 interspersed with flecks or particles made of intumescent materials and the second seal unit 214 made of uniform intumescent material will expand to maintain an effective seal.

Figure 3A:
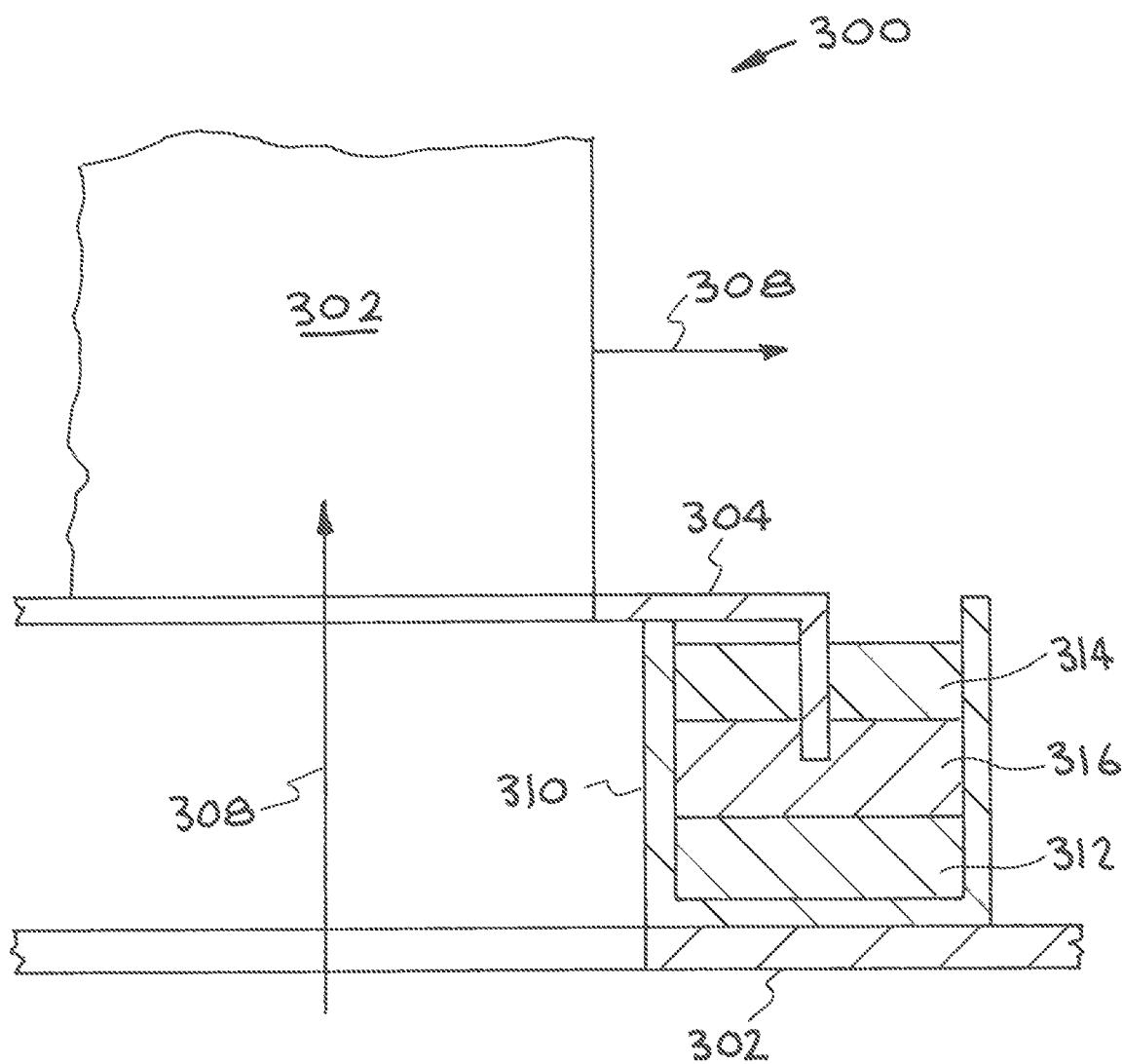
FIGS. 3A and 3B and 3C illustrate an example embodiment of the inventor's apparatus, systems, and methods including a first seal unit, a second seal unit, and a third seal unit.

Referring now to FIG. 3A, another example embodiment of the inventor's apparatus, systems, and methods is illustrated. This embodiment is designated generally by the reference numeral 300. FIG. 3A shows a filter 302 positioned over a base or filter support 304. The filter 302 and the base or filter support 304 are positioned over an enclosure 306 such as a wall, ceiling or floor. Flow of the fluid being filtered is identified by the reference numeral 308. The flow of the fluid 308 passes through the enclosure 306 into the filter element 302 and through the filter element 302 as indicated by the arrow 308. A seal housing 310 contains a seal that includes seal unit 312, seal unit 314, and seal unit 316. An extension or blade extends into the seal. The sealing system 300 includes the components listed below.

Component 302—filter,
Component 304—base or filter support,
Component 306—enclosure such as a wall, ceiling or floor,
Component 308—flow of the fluid,
Component 310—seal housing,
Component 312—first seal unit,
Component 314—second seal unit, and
Component 316—third seal unit.

The first seal unit 312 and the second seal unit 314 in this embodiment are interspersed with flecks or particles and flecks or particles made of intumescent materials; however, the number of particles per volume are different in first seal unit 312 than they are in the second seal unit 314. The first seal unit 312 and the second seal unit 314 that are interspersed with flecks or particles and flecks or particles made of intumescent materials can be made according to the embodiment of FIG. 1B; however, the number of flecks or particles per volume are different in first seal unit 312 than they are in the second seal unit 314. The first seal unit 312 contains less flecks or particles per volume and the second seal unit 314 contains more flecks or particles per volume.

In other embodiments, the first seal unit 312 and the second seal unit 314 that are interspersed with flecks or particles and flecks or particles made of intumescent materials can be made according to the embodiments of FIGS. 1C and 1D.

The third seal unit 316 is made of uniform intumescent material.

The first seal unit 312 containing less flecks or particles per volume is located below the third seal unit 316 made of uniform intumescent material. The second seal unit 314 containing more flecks or particles per volume is located above the third seal unit 316 made of uniform intumescent material. In the event of a fire or hot air the seal units 312, 314, and 316 will expand to maintain an effective seal.

Figure 3B:
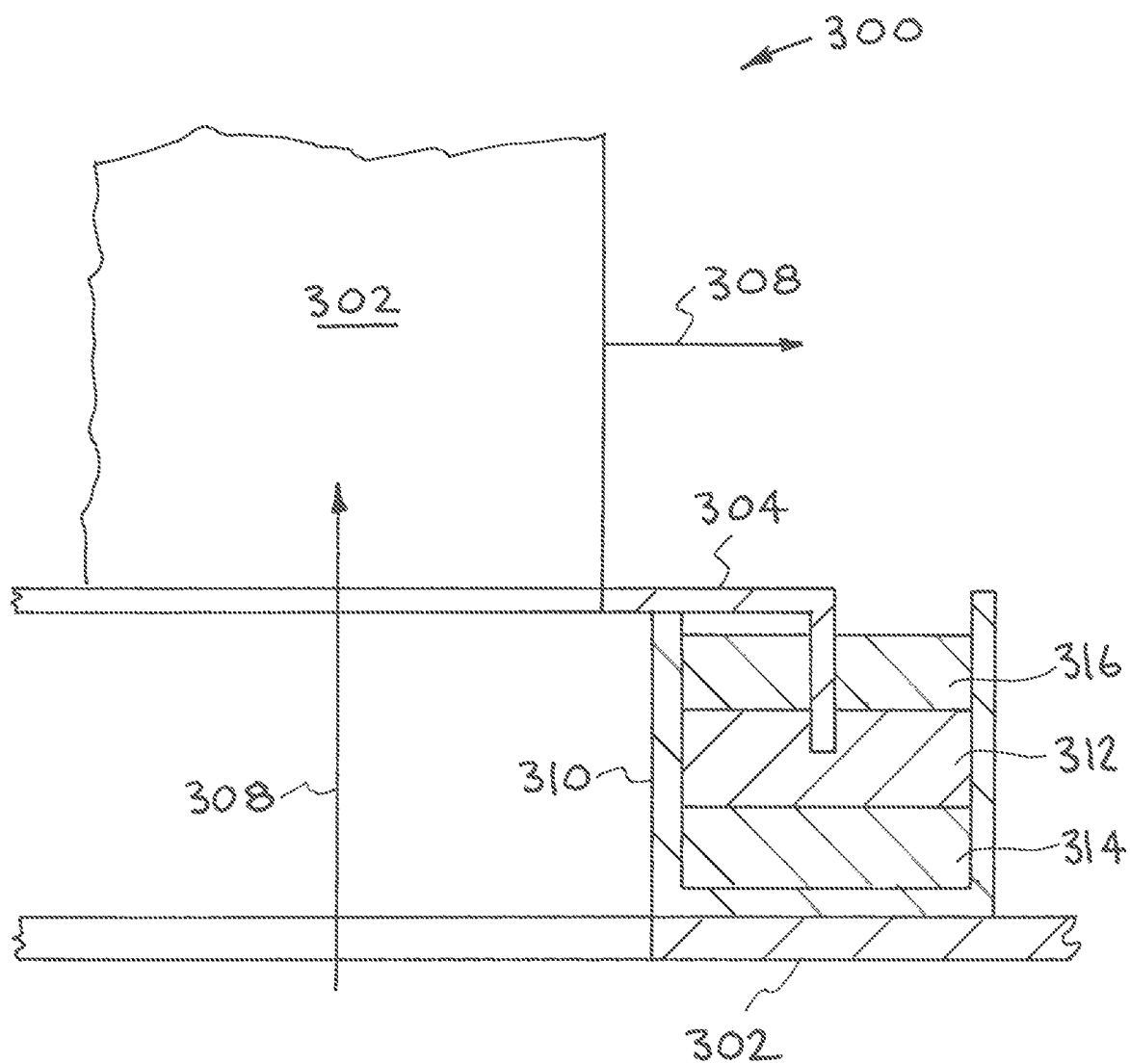

Referring now to FIG. 3B, another example embodiment of the inventor's apparatus, systems, and methods is illustrated. This embodiment is designated generally by the reference numeral 300. FIG. 3B shows a filter 302 positioned over a base or filter support 304. The filter 302 and the base or filter support 304 are positioned over an enclosure 306 such as a wall, ceiling or floor. Flow of the fluid being filtered is identified by the reference numeral 308. The flow of the fluid 308 passes through the enclosure 306 into the filter element 302 and through the filter element 302 as indicated by the arrow 308. A seal housing 310 contains a seal that includes seal unit 312, seal unit 314, and seal unit 316. An extension or blade extends into the seal. The sealing system 300 includes the components listed below.

Component 302—filter,
Component 304—base or filter support,
Component 306—enclosure such as a wall, ceiling or floor,
Component 308—flow of the fluid,
Component 310—seal housing,
Component 312—first seal unit,
Component 314—second seal unit, and
Component 316—third seal unit.

The first seal unit 312 and the second seal unit 314 in this embodiment are interspersed with flecks or particles and flecks or particles made of intumescent materials; however, the number of particles per volume are different in first seal unit 312 than they are in the second seal unit 314. The first seal unit 312 and the second seal unit 314 that are interspersed with flecks or particles and flecks or particles made of intumescent materials can be made according to the embodiment of FIG. 1B; however, the number of flecks or particles per volume are different in first seal unit 312 than they are in the second seal unit 314. The first seal unit 312 contains less flecks or particles per volume and the second seal unit 314 contains more flecks or particles per volume.

In other embodiments, the first seal unit 312 and the second seal unit 314 that are interspersed with flecks or particles and flecks or particles made of intumescent materials can be made according to the embodiments of FIGS. 1C and 1D.

The third seal unit 316 is made of uniform intumescent material.

The first seal unit 312 containing less flecks or particles per volume is located below the third seal unit 316 made of uniform intumescent material. The second seal unit 314 containing more flecks or particles per volume is located below the first seal unit 312 containing less flecks or particles per volume. In the event of a fire or hot air the seal units 312, 314, and 316 will expand to maintain an effective seal.

Figure 3C:
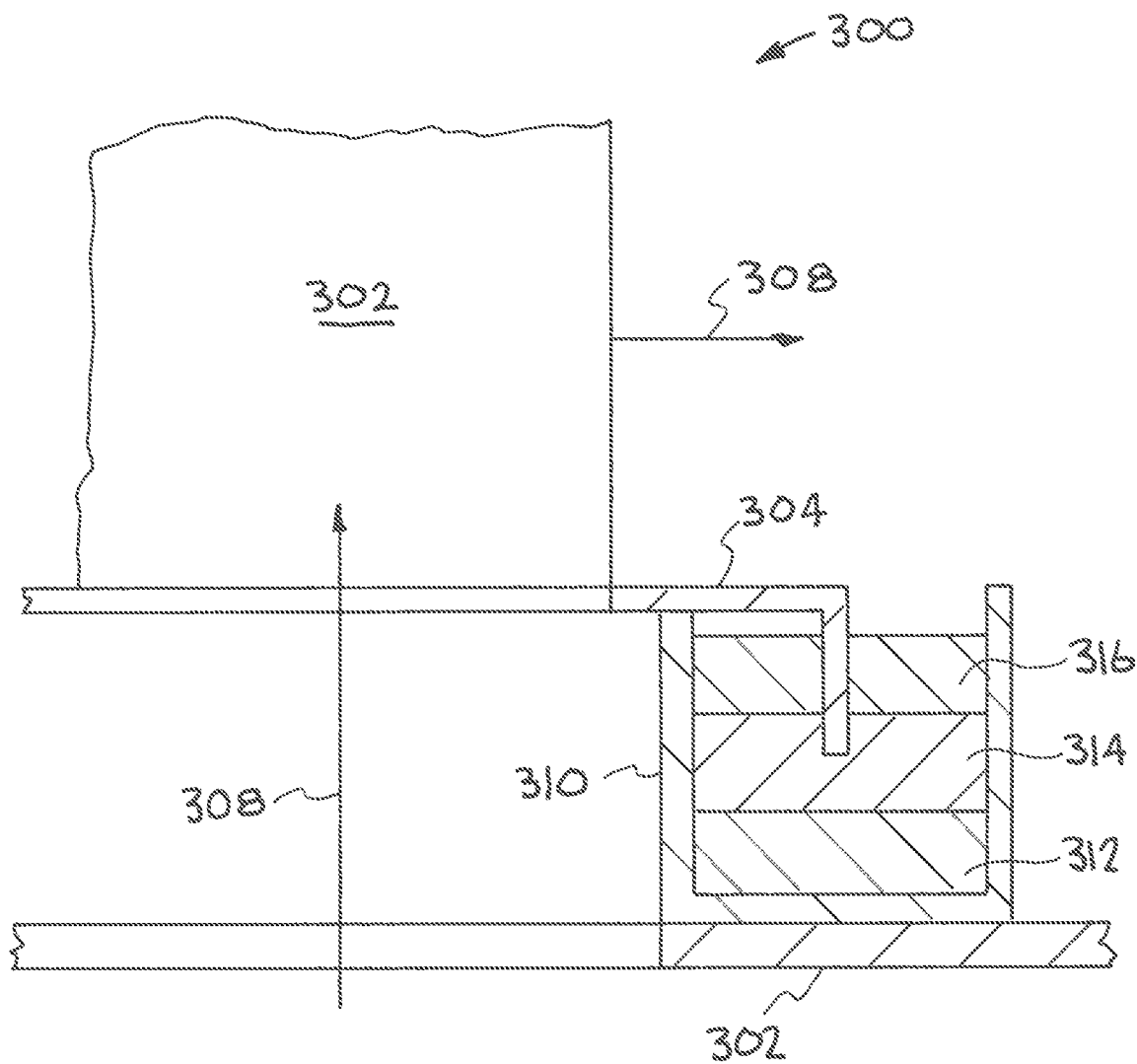

Referring now to FIG. 3C, another example embodiment of the inventor's apparatus, systems, and methods is illustrated. This embodiment is designated generally by the reference numeral 300. FIG. 3C shows a filter 302 positioned over a base or filter support 304. The filter 302 and the base or filter support 304 are positioned over an enclosure 306 such as a wall, ceiling or floor. Flow of the fluid being filtered is identified by the reference numeral 308. The flow of the fluid 308 passes through the enclosure 306 into the filter element 302 and through the filter element 302 as indicated by the arrow 308. A seal housing 310 contains a seal that includes seal unit 312, seal unit 314, and seal unit 316. An extension or blade extends into the seal. The sealing system 300 includes the components listed below.

Component 302—filter,
Component 304—base or filter support,
Component 306—enclosure such as a wall, ceiling or floor,
Component 308—flow of the fluid,
Component 310—seal housing,
Component 312—first seal unit,
Component 314—second seal unit, and
Component 316—third seal unit.

The first seal unit 312 and the second seal unit 314 in this embodiment are interspersed with flecks or particles and flecks or particles made of intumescent materials; however, the number of particles per volume are different in first seal unit 312 than they are in the second seal unit 314. The first seal unit 312 and the second seal unit 314 that are interspersed with flecks or particles and flecks or particles made of intumescent materials can be made according to the embodiment of FIG. 1B; however, the number of flecks or particles per volume are different in first seal unit 312 than they are in the second seal unit 314. The first seal unit 312 contains less flecks or particles per volume and the second seal unit 314 contains more flecks or particles per volume.

In other embodiments, the first seal unit 312 and the second seal unit 314 that are interspersed with flecks or particles and flecks or particles made of intumescent materials can be made according to the embodiments of FIGS. 1C and 1D.

The third seal unit 316 is made of uniform intumescent material.

The second seal unit 314 containing more flecks or particles per volume is located below the third seal unit 316 made of uniform intumescent material. The first seal unit 312 containing less flecks or particles per volume is located below the second seal unit 314 containing more flecks or particles per volume. In the event of a fire or hot air the seal units 312, 314, and 316 will expand to maintain an effective seal.

Figure 4:
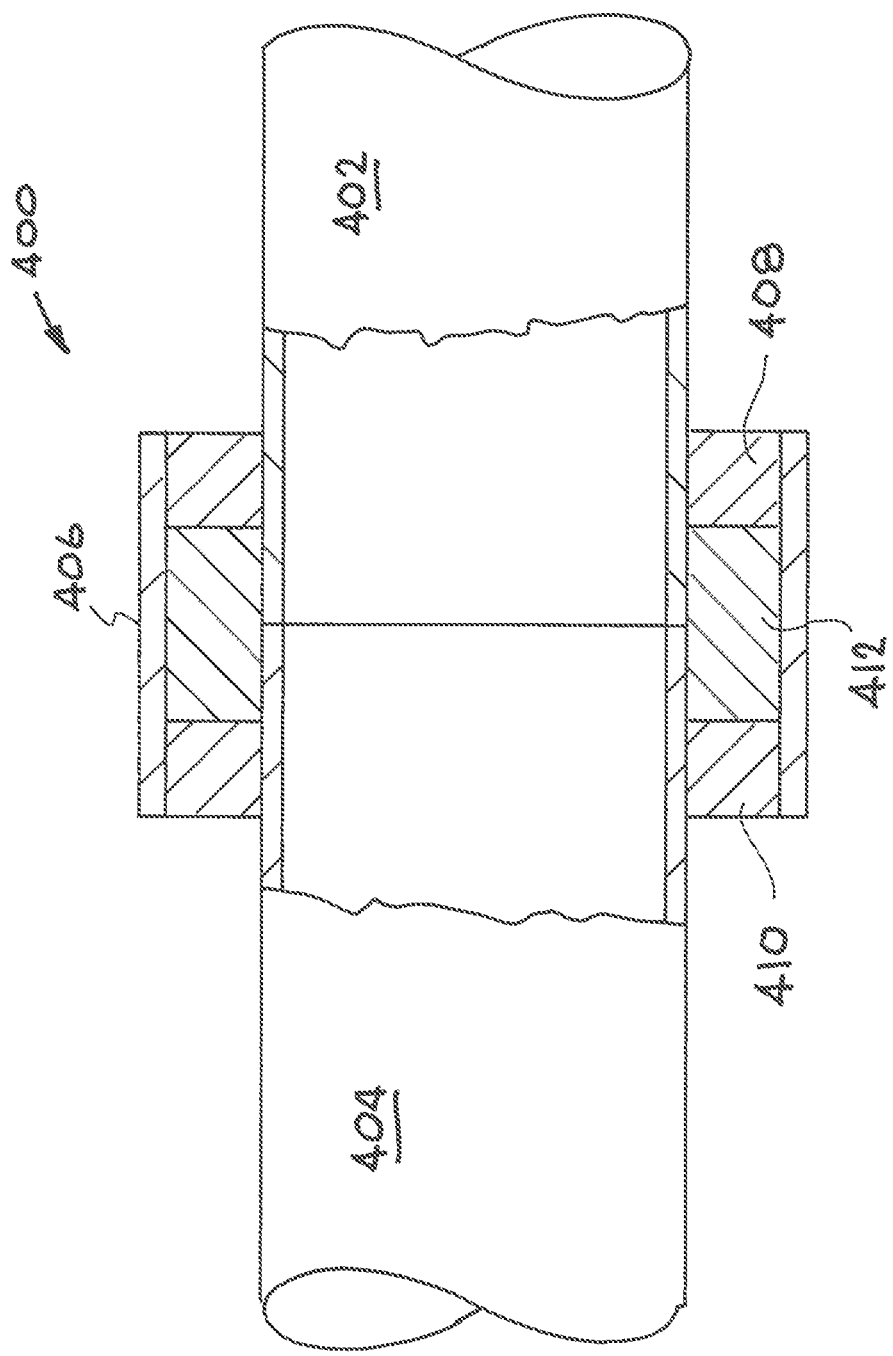
FIG. 4 illustrates a first ductwork, a second ductwork, and a combination seal between the first ductwork and the second ductwork.

Referring now to FIG. 4; another example embodiment of the inventor's apparatus, systems, and methods is illustrated. The inventor's apparatus, systems, and methods provide a combination sealing system. The combination sealing system is designated generally by the reference numeral 400. The combination sealing system 400 provides a sealing connection between a first ductwork 402 and a second ductwork 404. The combination sealing system 400 includes a combination seal made of a seal material with interspersed flecks or particles within in the seal material. The combination seal 400 is positioned relative to first ductwork 402 and the second ductwork 404. Upon the event of a fire or hot air the combination seal will expand to continue to seal the first ductwork 402 to the second ductwork 404 during the fire or hot air event.

Referring again to FIG. 4 the combination seal 400 is positioned relative to the first ductwork 402 and the second ductwork 404. The combination seal 400 includes a clamp 406, a first intumescent material seal unit 408, a second intumescent material seal unit 410 and a combination seal unit 412 wherein an intumescent material is interspersed within the seal material in the form of flecks or particles. The flow of fluid passes through the first ductwork 402 and the second ductwork 404. The combination seal unit 412 connects the first ductwork 402 and the second ductwork 404. The combination seal 400 includes the components listed below.

Component 402—first ductwork,
Component 404—second ductwork,
Component 406—clamp,
Component 408—first intumescent material seal unit,
Component 410—second intumescent material seal unit, and
Component 412—combination seal unit.

Referring again to FIG. 4, the combination seal unit 412 uses intumescent material(s), organic, or inorganic compound(s) in conjunction with a seal material. The intumescent material is interspersed within the seal material in the form of flecks or particles. The flecks or particles can be of several types, some that activate at lower temperatures and some at higher temperatures. They can also be of different expatiation ratios. The flecks or particles can be of different sizes and densities within the seal material for the desired performance. By limiting the quantity of flecks or particles of the seal by volume, the seal effectiveness and longevity can be maintained without compromise. This creates a new type of seal that is more heat resistant than the existing seal material by itself. The intumescent material is a material that undergoes a chemical change when exposed to heat or flames, becoming viscous then forming expanding bubbles that harden into a dense, heat insulating multi-cellular char. This expanding char can seal, insulate, and protect mating surfaces and joints, helping to prevent warping, subsequent leakage and damage.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus that seals a filter to a base and will continue to seal the filter to the base when exposed to heat in the event of hot air or fire, comprising:
a seal housing between the filter and the base wherein said seal housing has a first side and a second side opposite said first side;
a seal unit in said seal housing;
wherein said seal unit is a combination seal unit that substantially fills said seal housing and extends continuously from said first side to said second side, wherein said seal unit includes a gel seal material that extends continuously from said first side to said second side of said seal housing,
first individual interspersed particles of intumescent material interspersed within said gel seal material wherein each of said first individual interspersed particles are surrounded by said gel seal material wherein said first individual interspersed particles of intumescent material activate at a first temperature when exposed to the heat at said first temperature and form expanding bubbles that harden into a first dense heat insulating multi-cellular char,
second individual interspersed particles of intumescent material interspersed within said gel seal material wherein each of said second individual interspersed particles are surrounded by said gel seal material,
wherein said combination seal unit substantially fills said seal housing and extends continuously from said first side to said second side and is the only material in said seal housing,
wherein said first individual interspersed particles of intumescent material and said second individual interspersed particles of intumescent material are different,
wherein said second individual interspersed particles of intumescent material activate at a second temperature when exposed to the heat at said second temperature that is higher than said first temperature and form expanding bubbles that harden into a second dense heat insulating multi-cellular char,
wherein said first individual interspersed particles of intumescent material interspersed within said gel seal material and said second individual interspersed particles of intumescent material interspersed within said gel seal material are of different expatiation ratios; and
an extension blade that extends from the filter into said seal housing between said first side and said second side of said seal housing opposite said first side and into said seal unit and into said gel seal material with said first individual interspersed particles of intumescent material interspersed within said gel seal material and said second individual interspersed particles of intumescent material interspersed within said gel seal material that extends continuously from said first side to said second side of said seal housing and wherein said seal housing is positioned relative to the filter and the base to seal the filter to the base and w ill continue to seal in the event of hot air or fire.

2. An apparatus that seals a filter to a base and w ill continue to seal the filter to the base when exposed to heat in the event of hot air or fire, comprising:
a seal housing between the filter and the base wherein said seal housing has a first side and a second side opposite said first side;
a seal unit in said seal housing wherein said seal unit is a combination seal unit that substantially fills said seal housing and extends continuously from said first side to said second side and is the only material in said seal housing,
wherein said seal unit includes
a seal material wherein said seal material is a gel seal material that extends continuously from said first side to said second side of said seal housing, first individual particles of intumescent material interspersed within said gel seal material wherein each of said first individual particles are surrounded by said gel seal material wherein said first individual particles of intumescent material activate at a first temperature when exposed to the heat a said first temperature and form expanding bubbles that harden into a first dense heat insulating multi-cellular char, and second individual particles of intumescent material interspersed within said gel seal material wherein each of said first individual particles are surrounded by said gel seal material and said second individual particles are located interspersed with said first individual particles of intumescent material wherein said second individual particles of intumescent material activate at a second temperature when exposed to the heat at said second temperature that is lower than said first temperature and form expanding bubbles that harden into a second dense heat insulating multi-cellular char, wherein said first individual particles of intumescent material interspersed within said gel seal material and said second individual particles of intumescent material interspersed within said gel seal material are of different expatiation ratios, and an extension blade that extends from the filter into said seal housing between said first side and said second side of said seal housing opposite said first side and into said seal unit and into said gel seal material with said first individual particles of intumescent material interspersed within said gel seal material and said second individual particles of intumescent material interspersed within said gel seal material that extends continuously from said first side to said second side of said seal housing, and wherein said seal unit is positioned relative to the filter and the base to seal the filter to the base and w ill continue to seal in the event of hot air or fire.

3. An apparatus that seals a filter to a base and w ill continue to seal the filter to the base when exposed to heat in the event of hot air or fire having:

a seal housing between the filter and the base wherein said seal housing has a first side and a second side opposite said first side;

a seal unit in said seal housing;

wherein said seal unit is a combination seal unit that substantially fills said seal housing and extends continuously from said first side to said second side and is the only material in said seal housing, wherein said seal unit includes a gel seal material that extends continuously from said first side to said second side of said seal housing, first individual interspersed particles of intumescent material interspersed within said gel seal material wherein each of said first individual interspersed particles are surrounded by said gel seal material wherein said first individual interspersed particles of intumescent material activate at a first temperature when exposed to the heat at said first temperature and form expanding bubbles that harden into a first dense heat insulating multi-cellular char, second individual interspersed particles of intumescent material interspersed within said gel seal material wherein each of said second individual interspersed particles are surrounded by said gel seal material, wherein said first individual interspersed particles of intumescent material and said second individual interspersed particles of intumescent material are different, wherein said second individual interspersed particles of intumescent material activate at a second temperature when exposed to the heat at said second temperature that is higher than said first temperature and form expanding bubbles that harden into a second dense heat insulating multi-cellular char, wherein said first individual interspersed particles of intumescent material interspersed within said gel seal material and said second individual interspersed particles of intumescent material interspersed within said gel seal material are of different expatiation ratios; and an extension blade that extends from the filter into said seal housing between said first side and said second side of said seal housing opposite said first side and into said seal unit and into said gel seal material with said first individual interspersed particles of intumescent material interspersed within said gel seal material and said second individual interspersed particles of intumescent material interspersed within said gel seal material that extends continuously from said first side to said second side of said seal housing and wherein said seal housing is positioned relative to the filter and the base to seal the filter to the base and will continue to seal in the event of hot air or fire;

the improvement consisting of:

said combination seal unit consists of said gel seal material, said first individual interspersed particles of intumescent material, and said second individual interspersed particles of intumescent material that substantially fills said seal housing and extends continuously from said first side to said second side and is the only material in said seal housing.

* * * * *